United States Patent [19]
Kim

[11] Patent Number: 6,082,611
[45] Date of Patent: Jul. 4, 2000

[54] METHOD OF MAKING MULTI-PLY BOTTOM OF CLAD METAL COOKWARE

[76] Inventor: Myung Suk Kim, 12-12, Bangbae-Dong, Seocho-Ku, 137-060, Seoul, Rep. of Korea

[21] Appl. No.: 09/302,293

[22] Filed: Apr. 30, 1999

[30] Foreign Application Priority Data

Aug. 3, 1998 [KR] Rep. of Korea ............. 98-31536

[51] Int. Cl.[7] .................................................. B23K 20/02
[52] U.S. Cl. ................. 228/265; 228/190; 228/235.1; 220/912
[58] Field of Search ................... 228/115, 116, 228/112.1, 190, 265, 233.1, 235.1, 262.44; 220/626, 912

[56] References Cited

U.S. PATENT DOCUMENTS

| | | | |
|---|---|---|---|
| 2,908,073 | 10/1959 | Dulin | 156/172 |
| 4,029,253 | 6/1977 | Cartossi | 228/175 |
| 4,782,993 | 11/1988 | Cartossi | 228/265 |
| 5,064,055 | 11/1991 | Bessenbach et al. | 220/626 |
| 5,257,717 | 11/1993 | Galle | 228/173.6 |
| 5,439,165 | 8/1995 | Cartossi | 228/265 |

*Primary Examiner*—Samuel M. Heinrich
*Attorney, Agent, or Firm*—McDermott, Will & Emery

[57] ABSTRACT

A method of making a multi-ply bottom of clad metal cookware is disclosed. In the method, both an aluminum plate and a stainless steel cladding plate, externally laid on a base bottom of the clad metal cookware held on a friction press, is pressed down using an instantaneous pressure of the friction press, thus being integrated with the base bottom of the cookware in a way such that the stainless steel cladding plate is fully integrated with the base bottom of the cookware within a predetermined area including a corner of the base bottom. The instantaneous pressure of the friction press ranges from 800 tons to 1,500 tons. In the multi-ply bottom of this invention, the aluminum plate has a dense structure, and increases heat conductivity, heat conservativity, and thermal efficiency of the cookware while allowing the multi-ply bottom to be free from partially heating food in the cookware. The method also reduces the production cost of the cookware.

2 Claims, 3 Drawing Sheets

METHOD OF MAKING MULTI-PLY BOTTOM OF CLAD METAL COOKWARE

BACKGROUND OF THE INVENTION

1. Field of the Invention

The present invention relates, in general, to a method of making a multi-ply bottom of clad metal cookware and, more particularly, to a method of making a multi-ply bottom of clad metal cookware by externally integrating an aluminum plate, clad with a stainless steel plate, with the base bottom of the cookware into a single structure through a friction process using an instantaneous super-high pressure, thus almost completely preventing an unexpected removal of the aluminum plate from the bottom, the multi-ply bottom being also designed to allow food in the cookware to be uniformly and appropriately heated without being partially scorched or burnt at a position around the rounded corner of the bottom, thus making food tasty.

2. Description of the Prior Art

In the prior art, most cookware is typically made of a single metal. However, such single metal cookware is problematic in that it may be reduced in heat conductivity when it is designed to have a high degree of corrosion resistance, or it may be reduced in corrosion resistance when it is designed to have a high degree of heat conductivity. The known single metal cookware is thus inconvenient to users.

In an effort to overcome the above-mentioned problems experienced in the single metal cookware, clad metal cookware has been proposed and somewhat effectively used. As well known to those skilled in the art, a clad metal is a sheet material which is formed by integrating two or more different metal plates into a multi-ply metal plate. In the kitchenware art, a stainless steel-clad aluminum plate, or an aluminum plate clad with a stainless steel plate, is typically used as a material of clad metal cookware.

The stainless steel preferably has a high degree of corrosion resistance, but regrettably has a low degree of heat conductivity, thus being problematic in that it causes cookware to be partially heated when the bottom of the cookware is made of the stainless steel. Such a problem of the stainless steel is almost completely overcome when the stainless steel is used with aluminum in a clad metal. For example, a stainless steel plate, or STS304 plate, regrettably has a temperature difference of at least 200° C. between the center and the edge. However, in a clad metal plate consisting of an aluminum plate clad with a stainless steel plate, the temperature difference between the center and the edge is not higher than 25° C. That is, such a clad metal plate has a somewhat uniform temperature distribution. The clad metal plate, consisting of an aluminum plate clad with a stainless steel, has a high induction heating performance when cookware, made of said clad metal plate, is used in an induction heating cooker which has been widely used recently due to a high degree of thermal efficiency and operational stability.

However, known clad metal cookware is problematic in that the aluminum plate, or the main heat transferring plate, is so thin as to render the bottom of the cookware to be partially heated. Therefore, such clad metal cookware has a substantial temperature difference between the bottom, the middle portion of the sidewall, and the top edge portion of the sidewall, thus failing to uniformly heat food. That is, food, contained in such clad metal cookware, is more rapidly heated at the lower portion around the bottom of the cookware than the upper or middle portions. This makes the food undercooked, partially scorched or burnt, and so the food fails to have a good flavor.

In order to solve the problems experienced in such clad metal cookware, a multi-ply bottom brazing clad metal cookware has been proposed and used. An example of known multi-ply bottom brazing clad metal cookware is shown in FIG. 4. As shown in the drawing, the multi-ply bottom brazing clad metal cookware 6 has a multi-ply bottom, or a five-fly bottom 5. The above multi-ply bottom 5 is formed by brazing both an aluminum plate 1 and a stainless steel cladding plate 2 to the external surface of the base bottom of the cookware 6 using a pressing machine, such as a press, or a high-frequency heating machine. In such a case, a bonding material 3 is used in the brazing process. Such a multi-ply bottom 5 maximizes both the heat conductivity and heat conservativity of the cookware 6, thus allowing food in the cookware 6 to be uniformly heated and to have a good flavor. Such cookware 6 also conserves energy while cooking. However, the above multi-ply bottom brazing clad metal cookware 6 has a problem in that it is impossible to integrate the aluminum plate 1 to the rounded bottom of the cookware 6 since a sensitivity heating coil of known brazing machines is designed to only heat a flat surface. Therefore, food is partially scorched or burnt at a portion around the corner of the bottom which is directly affected by gas flames and fails to have a good flavor.

SUMMARY OF THE INVENTION

Accordingly, the present invention has been made keeping in mind the above problems occurring in the prior art, and an object of the present invention is to provide a method of making a multi-ply bottom of clad metal cookware, which instantaneously integrates both an aluminum plate and a stainless steel cladding plate with the exterior surface of the base bottom of clad metal cookware using an instantaneous super-high pressure of a friction press in a way such that the integration of the stainless steel cladding plate with the base bottom of the cookware completely occurs within a predetermined area, including the rounded corner of the base bottom, without using any bonding material, and which thus maximizes both heat conductivity and heat conservativity of the cookware, and allows food in the cookware to be uniformly heated without being partially scorched or burnt and to have a good flavor.

In order to accomplish the above object, the present invention provides a method of making a multi-ply bottom of clad metal cookware, comprising the step of: pressing down both an aluminum plate and a stainless steel cladding plate, externally laid on a base bottom of the clad metal cookware held on a friction press, using an instantaneous pressure of the friction press, thus integrating both plates with the base bottom of the cookware in a way such that the stainless steel cladding plate is fully integrated with the base bottom of the cookware within a predetermined area including a corner of the base bottom.

In the preferred embodiment, the instantaneous pressure of the friction press ranges from 800 tons to 1,500 tons.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
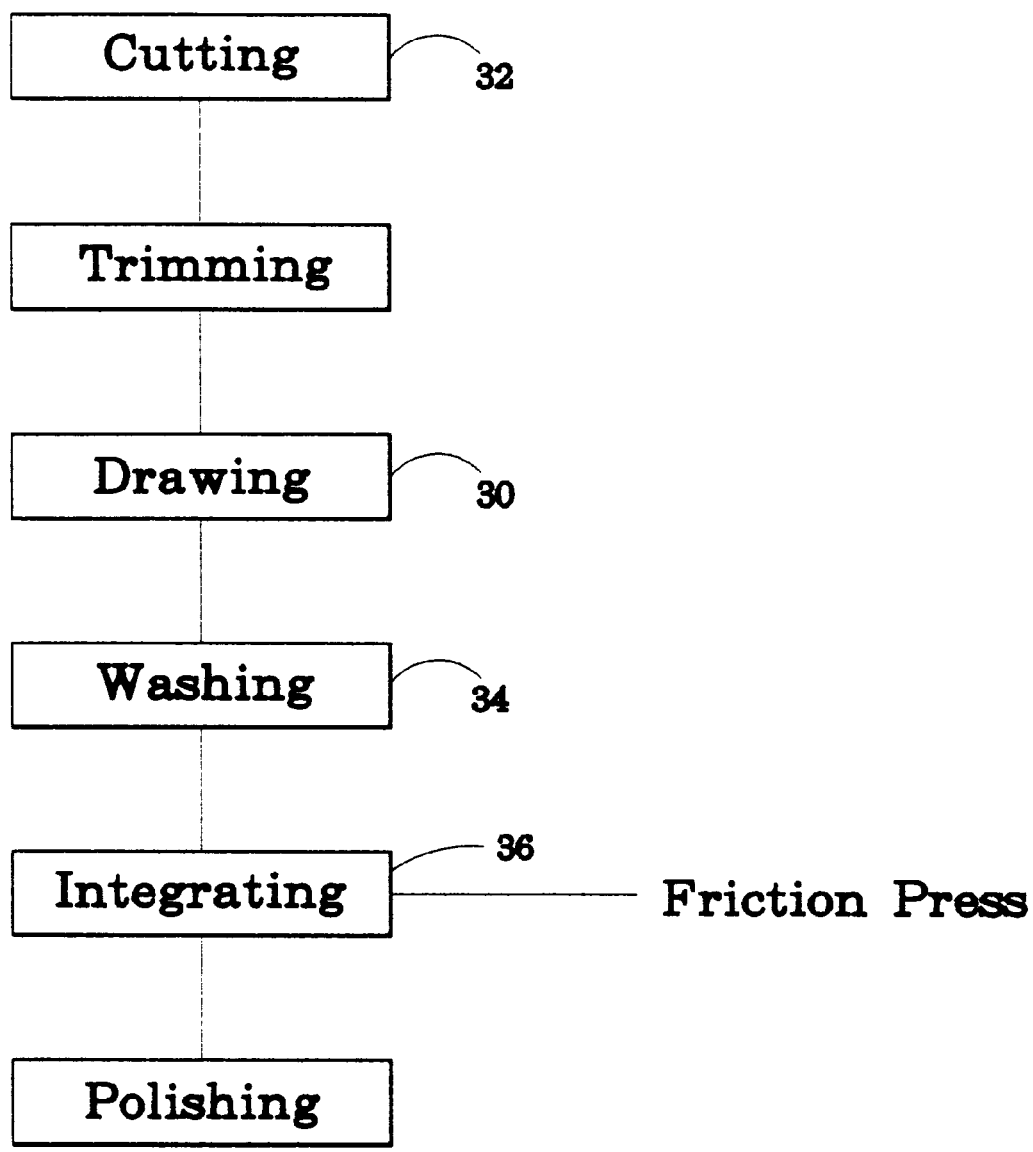
FIG. 1 is a block diagram, showing a method of making a multi-ply bottom of clad metal cookware in accordance with the preferred embodiment of the present invention.
Figure 2:
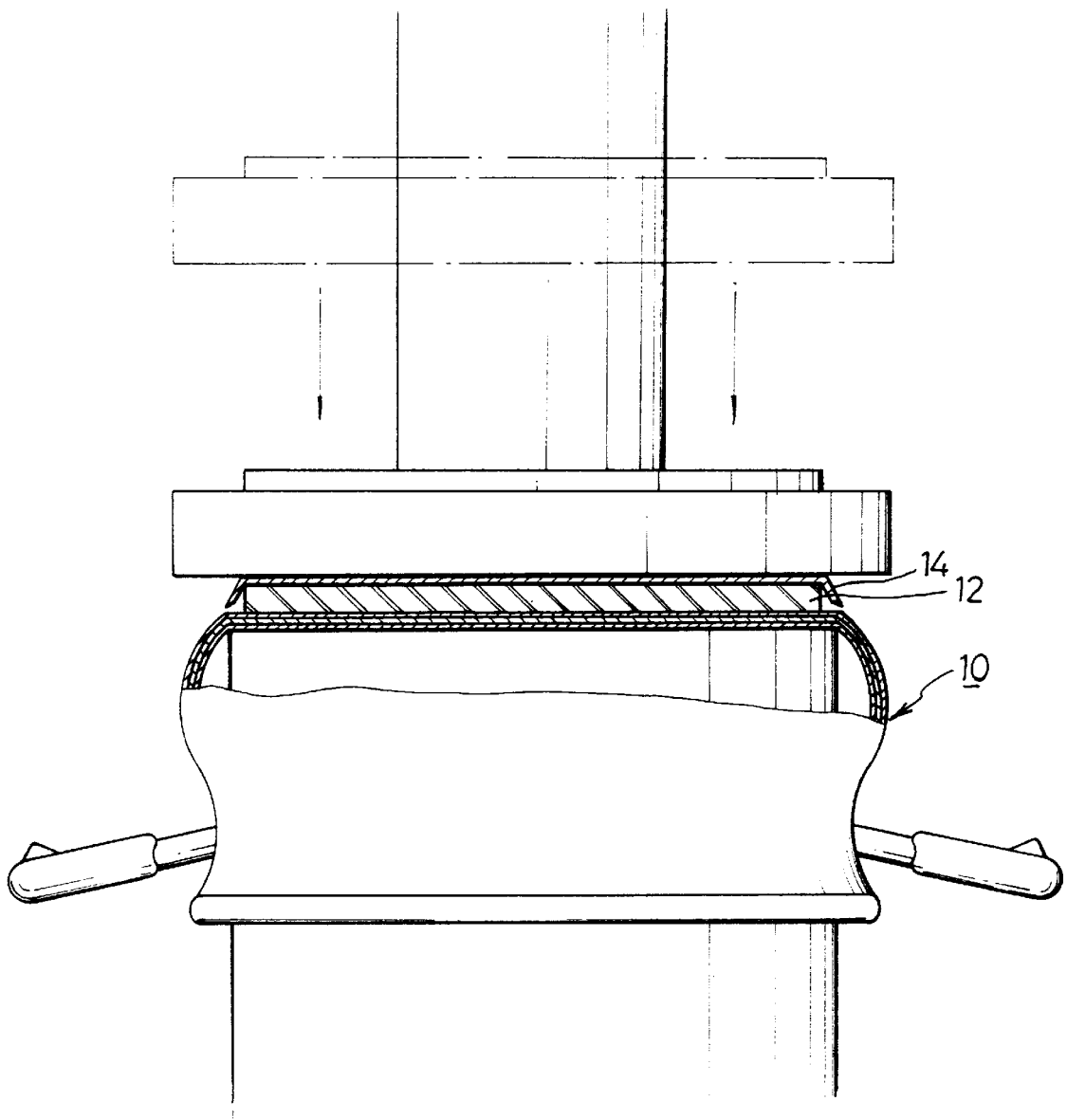
FIG. 2 is a partially sectioned view, showing a friction process of integrating both an aluminum plate and a stainless steel cladding plate with the base bottom of the cookware in accordance with the present invention.
Figure 3:
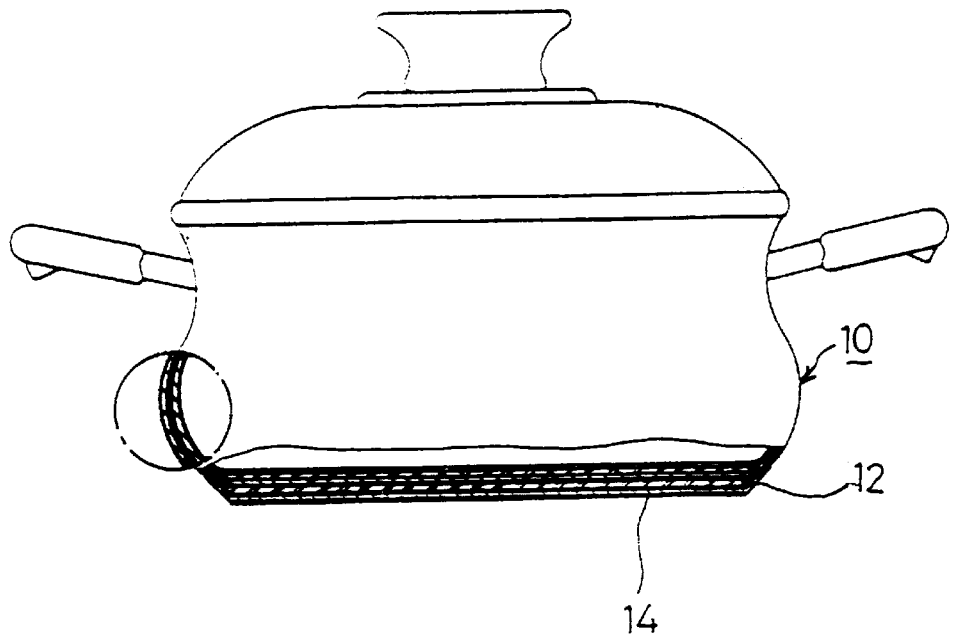
FIG. 3 is a sectional view of clad metal cookware having a multi-ply bottom formed through the friction process of this invention.
Figure 4:
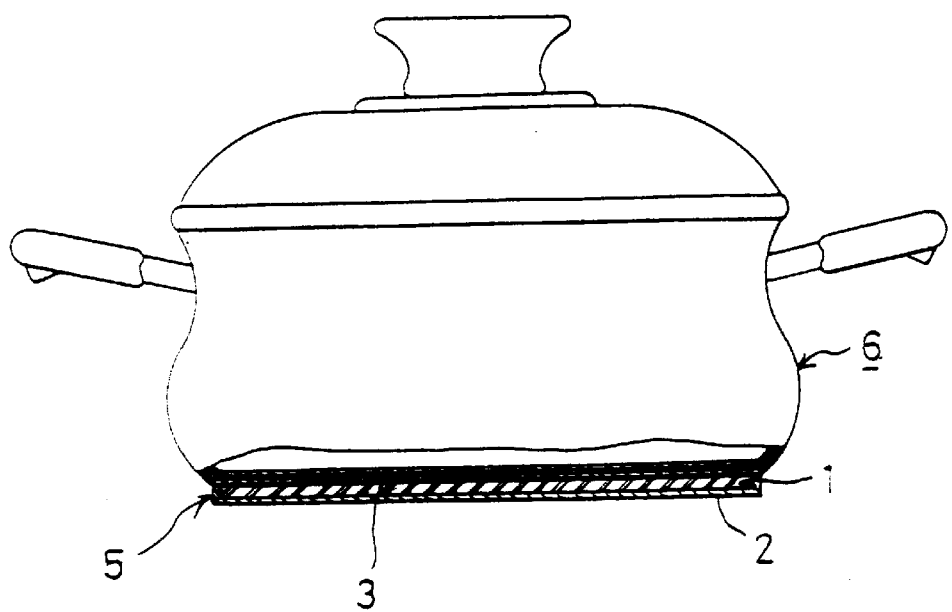
FIG. 4 is a sectional view of cookware having a multi-ply bottom formed through a typical brazing process.

FIG. 1 is a block diagram, showing a method of making a multi-ply bottom of clad metal cookware in accordance with the preferred embodiment of this invention. FIG. 2 is a partially sectioned view, showing a friction process of integrating both an aluminum plate and a stainless steel cladding plate with the base bottom of the cookware in accordance with this invention. FIG. 3 is a sectional view of clad metal cookware having a multi-ply bottom formed through the friction process of this invention.

As shown in the drawing, in order to make the multi-ply bottom of clad metal cookware of this invention, a raw metal sheet is cut into a plurality of pieces, individually having an appropriate size suitable for being formed as one desired piece of cookware, at a cutting step 32. Thereafter, each metal piece from the cutting step 32 is trimmed using a hydraulic trimming machine prior to being drawn into a desired three-dimensional shape at a drawing step 30, thus forming a piece of cookware. The cookware is, thereafter, washed at a washing step 34. The washing step 34 is followed by an integration step 36, wherein the cookware is subjected to a friction process. In the friction process, both an aluminum plate and a stainless steel cladding plate are externally integrated with the base bottom of the cookware using a friction press, thus forming a desired multi-ply bottom of the clad metal cookware.

In the friction process, both the aluminum plate 12 and the stainless steel cladding plate 14 are externally laid on the base bottom of the cookware 10, supported on the friction press, prior to being instantaneously pressed down using a super-high pressure of the friction press, thus being integrated with the base bottom. In such a case, the integration of the stainless steel cladding plate 14 with the base bottom of the cookware 10 completely occurs within a predetermined area including the rounded corner of the base bottom.

In the present invention, it is preferable to set the super-high pressure of the friction press for pressing down the two plates 12 and 14 to about 800–1,500 tons.

In addition, it is preferable to heat the aluminum plate 12 to a temperature of 450° C.–500° C. using an induction heater prior to performing the friction process. This improves the integration force of the aluminum plate 12 and results in a uniform integration of the aluminum plate 12.

That is, during such a friction process, both the aluminum plate 12 and the stainless steel plate 14 are externally laid on the base bottom of the cookware 10, supported on the friction press, as shown in FIG. 2. The above aluminum plate 12 is heated to a temperature of 450° C.–500° C. using an induction heater prior to being subjected to the friction process, and so the ductility of the aluminum plate 12 is increased. After setting the two plates 12 and 14, both plates 12 and 14 are instantaneously pressed down using a super-high pressure of the friction press. The induction-heated and easily ductile aluminum plate 12 is thus uniformly spread widely within an area between the base bottom and the stainless steel cladding plate 14. The aluminum plate 12 is firmly and uniformly integrated with both the base bottom and the stainless steel plate 14 without leaving any cavity between the base bottom and the stainless steel cladding plate 14.

As best seen in FIG. 3, the integration of the stainless steel cladding plate 14 with the base bottom of the cookware 10 completely occurs within a predetermined area including the rounded corner of the base bottom. Therefore, the cookware of this invention effectively prevents food from being partially scorched or burnt at a portion around the corner of the bottom even when the corner is affected by gas flames.

The integration force of the aluminum plate 12, clad with the stainless steel plate 14, with the base bottom of the cookware 10 maintains semi-permanently, and so the clad metal cookware 10 may be effectively used for a lengthy period of time. In addition, the multi-ply bottom of this invention may be formed while somewhat freely changing the thickness of the aluminum plate 12 in accordance with use of cookware 10 as desired. In the multi-ply bottom of this invention, the aluminum plate 12 is substantially thick, and is integrated with the total area of the base bottom of the cookware 10 including the rounded corners of the base bottom. Therefore, the multi-ply bottom maximizes heat conductivity, heat conservativity, and thermal efficiency of cookware 10. This effectively prevents food, contained in the cookware 10, from being partially scorched or burnt at a portion around the corner of the bottom.

As described above, the present invention provides a method of making a multi-ply bottom of clad metal cookware. The method firmly integrates both an aluminum plate and a stainless steel cladding plate with the base bottom of clad metal cookware using an instantaneous super-high pressure of a friction press, with the integration of the stainless steel cladding plate with the base bottom completely occurring within a predetermined area including the rounded corner of the base bottom. Therefore, the aluminum plate of the multi-ply bottom has a dense structure. The multi-ply bottom of this invention also increases heat conductivity, heat conservativity, and thermal efficiency of the cookware while being free from partially heating food in the cookware. Another advantage of the method resides in that its reduces the production cost of the cookware.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of making a multi-ply bottom of clad metal cookware, comprising the step of:

pressing down both an aluminum plate and a stainless steel cladding plate, externally laid on a base bottom of the clad metal cookware held on a friction press, using an instantaneous pressure of said friction press, thus integrating both plates with the base bottom of the cookware in a way such that said stainless steel cladding plate is fully integrated with the base bottom of the cookware within a predetermined area including a corner of said base bottom.

2. The method according to claim 1, wherein said instantaneous pressure of the friction press ranges from 800 tons to 1,500 tons.

* * * * *